(12) United States Patent
Varjabedian (10) Patent No.: US 11,557,864 B2
(45) Date of Patent: Jan. 17, 2023

(54) APPARATUS TO SECURE A CHARGER BLOCK AND/OR CORD

(71) Applicant: Shaant Varjabedian, Tampa, FL (US)

(72) Inventor: Shaant Varjabedian, Tampa, FL (US)

( * ) Notice: Subject to any disclaimer, the term of this patent is extended or adjusted under 35 U.S.C. 154(b) by 164 days.

(21) Appl. No.: 17/068,192

(22) Filed: Oct. 12, 2020

(65) Prior Publication Data

US 2021/0119390 A1    Apr. 22, 2021

Related U.S. Application Data (60) Provisional application No. 62/982,167, filed on Feb. 27, 2020, provisional application No. 62/924,267, filed on Oct. 22, 2019.

(51) Int. Cl.
| | | |
|---|---|---|
| *H01R 13/639* | (2006.01) | |
| *H01R 13/73* | (2006.01) | |
| *H01R 31/06* | (2006.01) | |

(52) U.S. Cl.
CPC ........... *H01R 13/73* (2013.01); *H01R 31/065* (2013.01)

(58) Field of Classification Search
CPC ........ H01R 13/73; H01R 31/065; H02G 3/18; H02G 3/32
See application file for complete search history.

(56) References Cited

U.S. PATENT DOCUMENTS

| | | | |
|---|---|---|---|
| 3,811,104 A * | 5/1974 | Caldwell ............ | H01R 13/6395 439/373 |
| 4,045,108 A * | 8/1977 | Olsen ................. | H01R 13/6395 439/373 |
| D325,564 S * | 4/1992 | Lemke ......................... | D13/154 |
| D440,005 S | 4/2001 | Blanton | |
| 7,014,493 B1 * | 3/2006 | Battard .............. | H01R 13/6395 439/373 |
| 7,056,145 B2 * | 6/2006 | Campbell, III .... | H01R 13/6395 174/67 |
| 7,384,304 B1 * | 6/2008 | Fawcett ............. | H01R 13/6395 439/567 |
| D610,901 S | 3/2010 | Jones | |
| 8,021,174 B1 * | 9/2011 | Schutte .............. | H01R 13/6392 439/373 |
| 8,070,111 B1 * | 12/2011 | Zeller ...................... | H02G 3/32 248/65 |
| D739,853 S | 9/2015 | Lee | |
| 9,147,973 B1 * | 9/2015 | Madison ............ | H01R 13/6395 |
| 9,350,151 B2 * | 5/2016 | Michaelis, IV ........ | H02G 3/083 |
| 9,653,898 B1 * | 5/2017 | Deaton .................... | H02G 3/14 |
| 10,439,327 B1 * | 10/2019 | Cyzen .................... | H01R 27/02 |
| D918,145 S | 5/2021 | Varjabedian | |
| 11,005,247 B1 * | 5/2021 | Booyse ..................... | H02G 3/18 |
| 2017/0214201 A1 * | 7/2017 | Armstrong ............... | H02G 3/14 |
| 2019/0052018 A1 * | 2/2019 | Cyzen ................ | H01R 13/6395 |
| 2019/0140397 A1 * | 5/2019 | Crowder .............. | H01R 13/639 |
| 2021/0119390 A1 * | 4/2021 | Varjabedian ............. | H02G 3/32 |

\* cited by examiner

*Primary Examiner* — Abdullah A Riyami
*Assistant Examiner* — Nelson R. Burgos-Guntin
(74) *Attorney, Agent, or Firm* — Merchant & Gould P.C.

(57) ABSTRACT

An apparatus is provided that may be used to secure an object or objects, such as a charging cord and/or charging adapter or block for example, at a location, such as at an alternating current (AC) wall outlet or other electrical outlet. Apparatus can be sized and dimensioned to secure a complimentary smartphone or cellphone and/or computer (e.g., laptop, tablet, etc.) charging cord and/or charging adapter or block to an electrical outlet using a keyed or other mated fastener.

20 Claims, 10 Drawing Sheets

APPARATUS TO SECURE A CHARGER BLOCK AND/OR CORD

RELATED APPLICATIONS

This application claims the benefit of U.S. Provisional Application No. 62/924,267 filed Oct. 22, 2019 and U.S. Provisional Application No. 62/982,167, filed Feb. 27, 2020 which are incorporated herein in their entireties.

BACKGROUND

Handheld telephonic devices (also referred to as cell phones, mobile phones, or smart phones) and portable computers (e.g., laptops, tablets, etc.) are typically sold with a charging cord and/or a charging adapter or wall plug that are used to charge an internal rechargeable battery. Due in part to the small size of the charging cord and/or charging adapter, these items can be easily lost, misplaced, or appropriated by other users. Accordingly, keeping track of the charging cord and/or charging adapter can be a frustrating experience, especially when the associated phone or computer is in need of charging the battery. For example, a charging cord and/or charging adapter may be borrowed by a family member or misappropriated by another user for their own phone or computer. It is not uncommon for users to misplace or lose chargers and/or charger cords due to the ease of disconnecting the chargers and/or cords from wall outlets or other charging sources.

SUMMARY

In various aspects, an apparatus is provided and configured to secure an object or objects, such as a charging cord and/or charging adapter or block for example, at a location, such as at an alternating current (AC) wall outlet or other electrical outlet. In one aspect, the apparatus is sized and dimensioned to secure a complimentary smartphone or cellphone and/or computer (e.g., laptop, tablet, etc.) charging cord and/or charging adapter or block to an electrical outlet using a keyed or other mated fastener. Other embodiments are disclosed.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

In various aspects, an apparatus is provided to secure a charging adapter or block and/or cord at a location, such as at an alternating current (AC) wall outlet or other electrical outlet. In one aspect, the apparatus is sized and dimensioned to secure a complimentary smartphone or cellphone and/or computer (e.g., laptop, tablet, etc.) charging cord and/or charging adapter or block to an electrical outlet using a keyed or other mated fastener. However, the apparatus can be used in additional applications as described further below. In one aspect, the apparatus is provided with a threaded fastener, such as a screw having an allen wrench or other type screw head and/or a complimentary wrench or tool as keyed fastener components. A kit can include a charger lock, a charger block, a charger cord, a keyed fastener, and/or a fastener.

As shown in FIGS. 1A-1J, apparatus 100 can be deployed to secure a charger block and/or charger cord to an electrical outlet of a building, automobile, train, or other component using one or more coupling surfaces of the apparatus 100 in conjunction with a threaded fastener secured via a tool, such as a specially-sized allen wrench or other tool. By using a particular fastener and mated wrench or tool, an individual is unable to use standard tools, such as a Philips or flathead screwdriver for example, to appropriate the charging cord and/or charging adapter/block from an electrical outlet. However, apparatus 100 is configured to enable use of a threaded screw that is typically used with an AC wall outlet cover in conjunction with a flathead or Philips screwdriver to secure the apparatus 100 to the AC outlet and/or outlet cover.

Figure 1A:
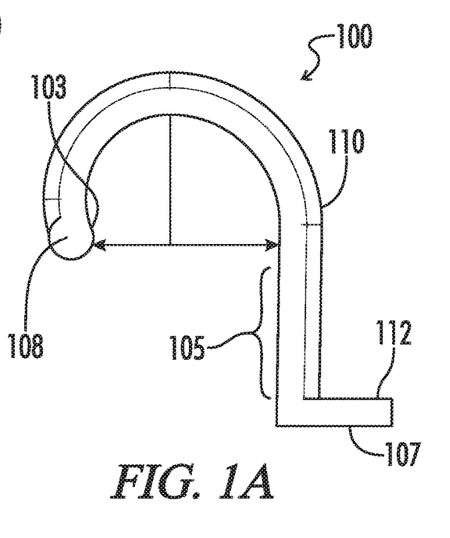
FIG. 1A is a side view of apparatus according to an embodiment.
Figure 1B:
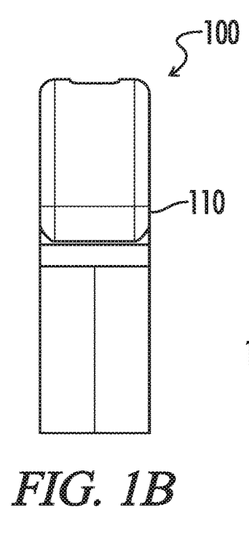
FIG. 1B is a front view of the apparatus.
Figure 1C:
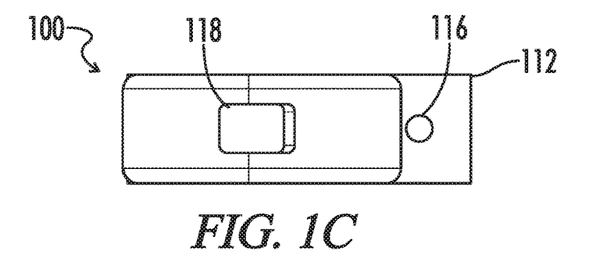
FIG. 1C is a top view of the apparatus.
Figure 1D:
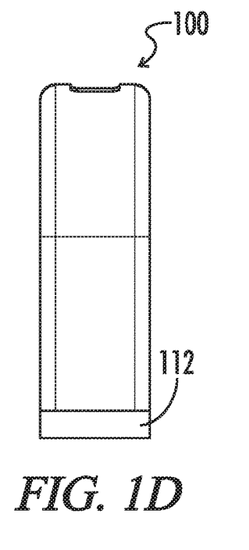
FIG. 1D is a rear view of the apparatus.
Figure 1E:
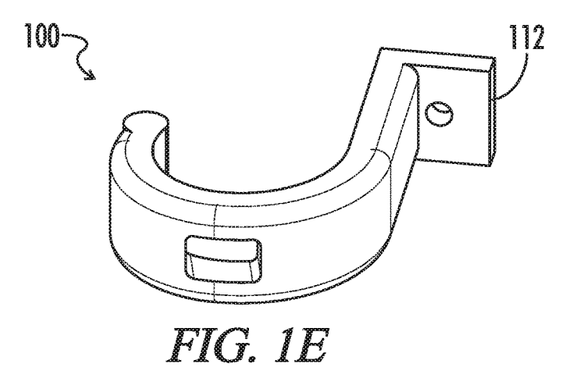
FIG. 1E is a perspective view of the apparatus.
Figure 1F:
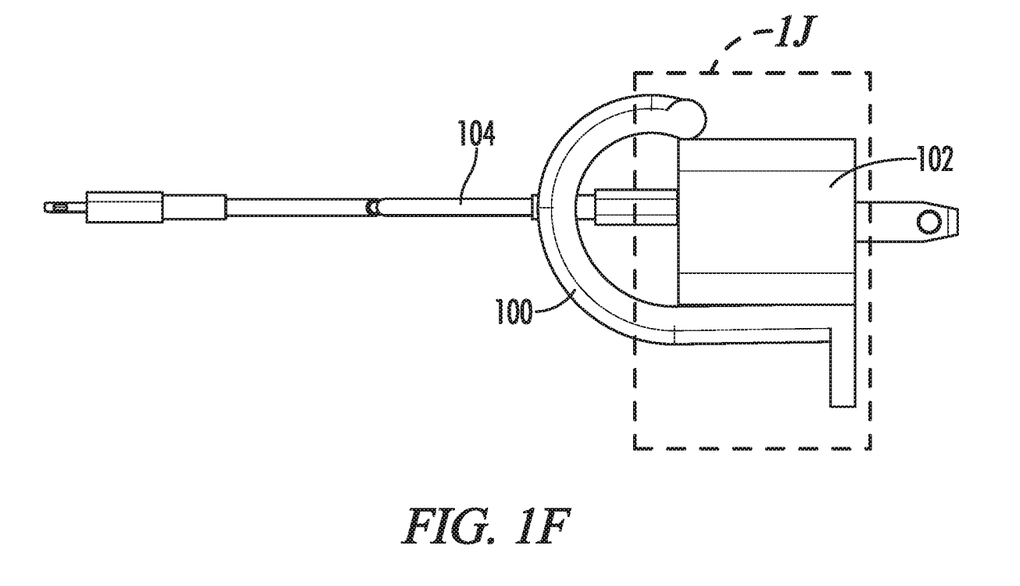
FIG. 1F is a side view of the apparatus coupled to a charging cord and charging adapter.

FIG. 1A is a side view of apparatus 100 according to an embodiment. As seen from the side view of FIG. 1A, apparatus 100 has a substantially hook or J-shape. As seen from the side, and as one example, apparatus 100 can be configured for an IPHONE charger block and is about 38 mm wide and about 49.5 mm long, having thickness of about 4.5 mm; and about 38 mm wide and 64 mm long, having thickness of about 4.5 mm for an IPAD PRO charger block.

Viewed from the front (FIG. 1B) the width of apparatus 100 is about 14.3 mm. The radius of the hook or curved portion of portion 110 of apparatus 100 can be about 11 or 12 mm and can vary in radial length along the length of the curve in different configurations. As described below, the apparatus 100 is configured to prevent or make difficult, removal of a charger block and/or cord once secured to an electrical outlet.

The hook or J-shape of apparatus 100 can be configured to apply a clamping or inwardly directed force (compression) to one or more surfaces of a charging adapter or block 102 which holds the charger block firmly in place. The hook or J-shape of apparatus 100 includes coupling surfaces 103, 105, and 107. Coupling surface 103 couples to a portion of an upper surface of a charging block 102, coupling surface 105 couples to all or a portion of a lower surface of the charging block 102, and coupling surface 107 couples to an electrical outlet (e.g., wall plate and/or wall outlet 114 (see FIGS. 1H, 1I)). In an aspect, apparatus 100 includes substantially planar or flat and/or smooth outer and inner surfaces which can include rounded to sharp edges. Coupling surface 105 of the substantially linear portion is configured to have a length that is the same or about the same as a length of a corresponding charger block surface (e.g., side surface length). For example, surface 105 of the substantially linear portion is about 28 mm long for an IPHONE charger block and about 39 mm for an IPAD charger block.

As shown in FIG. 1A, the apparatus 100 includes a first portion 110 and a second portion 112. The first portion or clamp portion 110 is curved or bent and includes a substantially linear portion and a substantially curved portion that comprise the coupling surfaces 103 and 105. When engaged, coupling surfaces 103 and 105 couple to opposing charging block 102 surfaces and the second portion or outlet abutment portion 112 includes the coupling surface 107 that couples to an electrical outlet, such as a wall plate and/or wall outlet 114 (e.g., 120V AC 3-prong outlet). In one embodiment, coupling surface 103 of portion 110 is configured as a lateral rib 108 or rounded surface at the terminal or end portion of portion 110. In other aspects, the terminal end of the substantially curved portion can include a flat, sloped, pointed, or other shaped coupling surface. The distance from surface 103 to the inner surface of portion 110 is about 25 mm (measured perpendicularly) which is a smaller distance than the height of the charger block so that the charger block is clamped and held securely by apparatus 100. The curvature of surface 103 assists when engaging and disengaging charger block 102 from apparatus 100, while also configured to apply a compression force when engaging and engaged with charger block 102. The curved surface 103 of rib 108 allows charger block 102 to be readily inserted into the interior of apparatus 100 and also, due in part to protruding below the inner surface of apparatus 100, applies a downward force that secures charger block 102. Rib 108 can have a diameter of about 6.2 mm and can be configured with different dimensions and/or shapes in order to produce larger or smaller amounts of holding force. Instead of smooth inner and/or outer surfaces, apparatus 100 can be knurled or otherwise roughened to apply additional holding force. Surface 103, surface 105, and overall hook-shape of the apparatus operate to apply a holding force to a charger block 102 when engaged. Apparatus 100 can be sized and configured to secure a variety of sized and dimensioned charger cords and/or adapters and/or wall plugs. As described above, the substantially linear and curved portions of first portion 110, including rib 108, of apparatus 100, when coupled to a charging adapter 102 or wall plug, applies a contact force or inward force that secures charging adapter 102 by surface contact and associated distributed force.

The first portion 110 includes an orifice 118 for threading and securing a charging cord. According to an embodiment, the orifice 118 is chamfered or angled inwardly (from the inner surface to the outer surface) and sized and dimensioned to allow a smaller end (typically the phone-side coupling) (but not the USB or larger end) of the charger cord 104 to be threaded therethrough when mounting to a wall outlet. The larger end of the charger cord 104 (typically a USB coupling) is unable to pull through the orifice 118 due to the smaller size of the orifice 118.

According to one embodiment, second portion 112 includes a through hole or orifice 116 that is sized and dimensioned to accommodate a threaded screw or other fastener that mates to wall plate and/or wall outlet 114. For example, orifice 116 can be about 3 mm in diameter. The coupling surface 107 of the second portion 112 that abuts against an electrical outlet, such as a wall plate and/or wall outlet 114 is substantially flat and the surface area is sized and dimensioned to mate to a surface of the electrical outlet. For example, the surface 107 of portion 112 can be about 16.3 mm×14.4 mm and portion 112 is about 4.2 mm thick. When plugged in, the mating or mounting surface of the charging adapter or block 102 provides additional surface area that enables a secure immovable coupling when fastened with a threaded or other fastener. According to an embodiment, when coupled together, the mating or wall mounting surface of the charging adapter and the coupling surface 107 of the second portion 112 of the apparatus 100 results in a larger substantially contiguous surface area for mounting and/or engaging with wall outlet.

Apparatus 100 can be formed and fabricated in a variety of ways using various means and materials, such as 3-D printing, injection molding, or other techniques and existing methods. Plastics, metals, and/or other materials can be used to manufacture apparatus 100. Additionally, apparatus 100 can be utilized for other applications. For example, apparatus 100 can be sized and dimensioned to prevent or limit a 2 prong or 3 prong electric cord end from shaking loose or inadvertently being removed (e.g., pulled loose) from a wall outlet. The apparatus 100 can be used to contain the male end of the electric cord in a removably connected manner with a wall outlet utilizing a removable fastener, such as outlet plate screw. In one example, the apparatus 100 can include a thumb screw or fastener that does not require a tool to remove the fastener from a wall outlet. Aspects described herein can further be combined to achieve different configurations including sizing and/or dimensioning to accommodate a particular application.

One example manufacturing process of apparatus 100 includes:

Step 1: File for the object is created using 3-D CAD program.

Step 2: File sent to slicing platform for 3D printing.

Step 3: Object is printed out on 3-D printer with PLA film or other material.

Figure 1G:
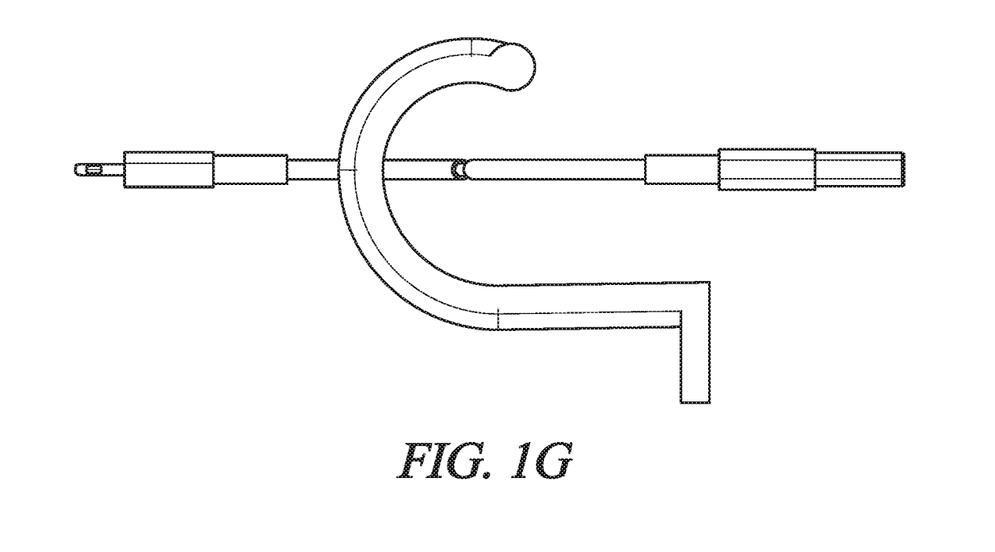
FIG. 1G is a side view of the apparatus with a smaller portion of the charging cord threaded through a through port or orifice of the apparatus.
Figure 1H:
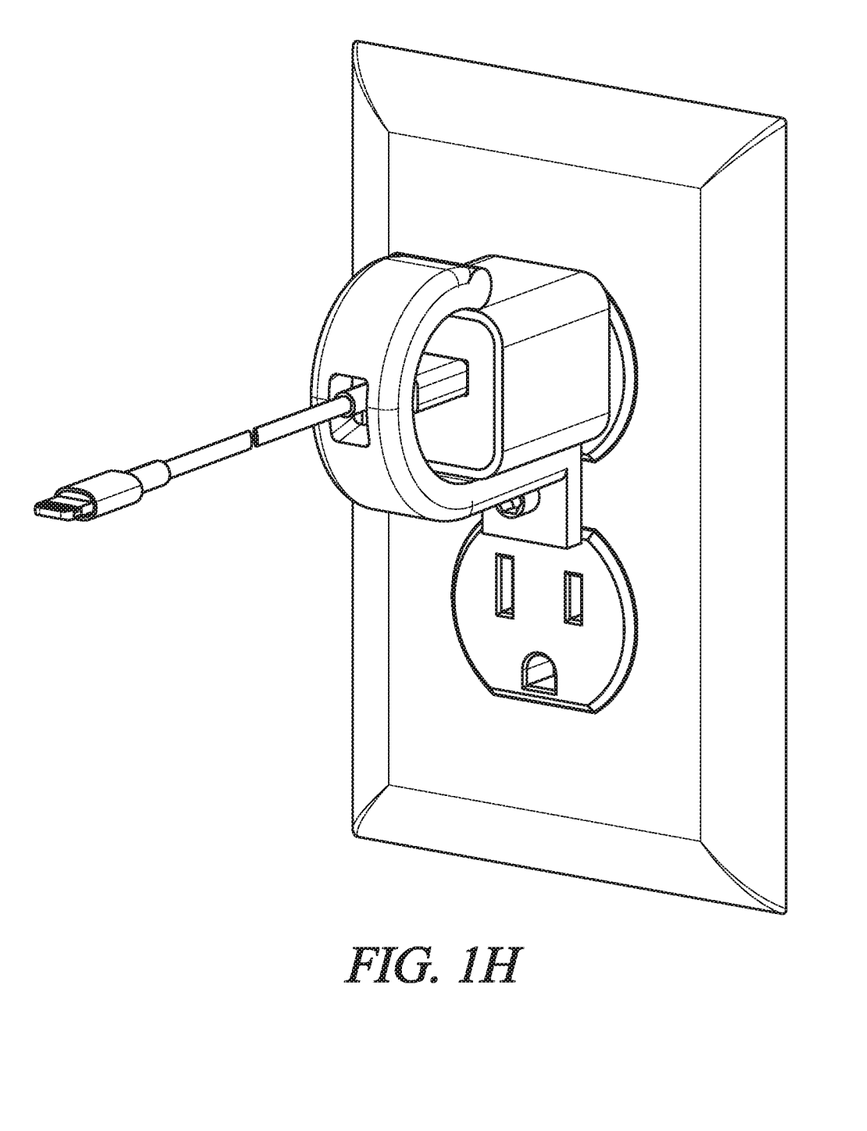
FIG. 1H is a perspective view of the apparatus coupled to a charging cord and charging adapter and secured to a wall outlet using a threaded fastener.
Figure 1I:
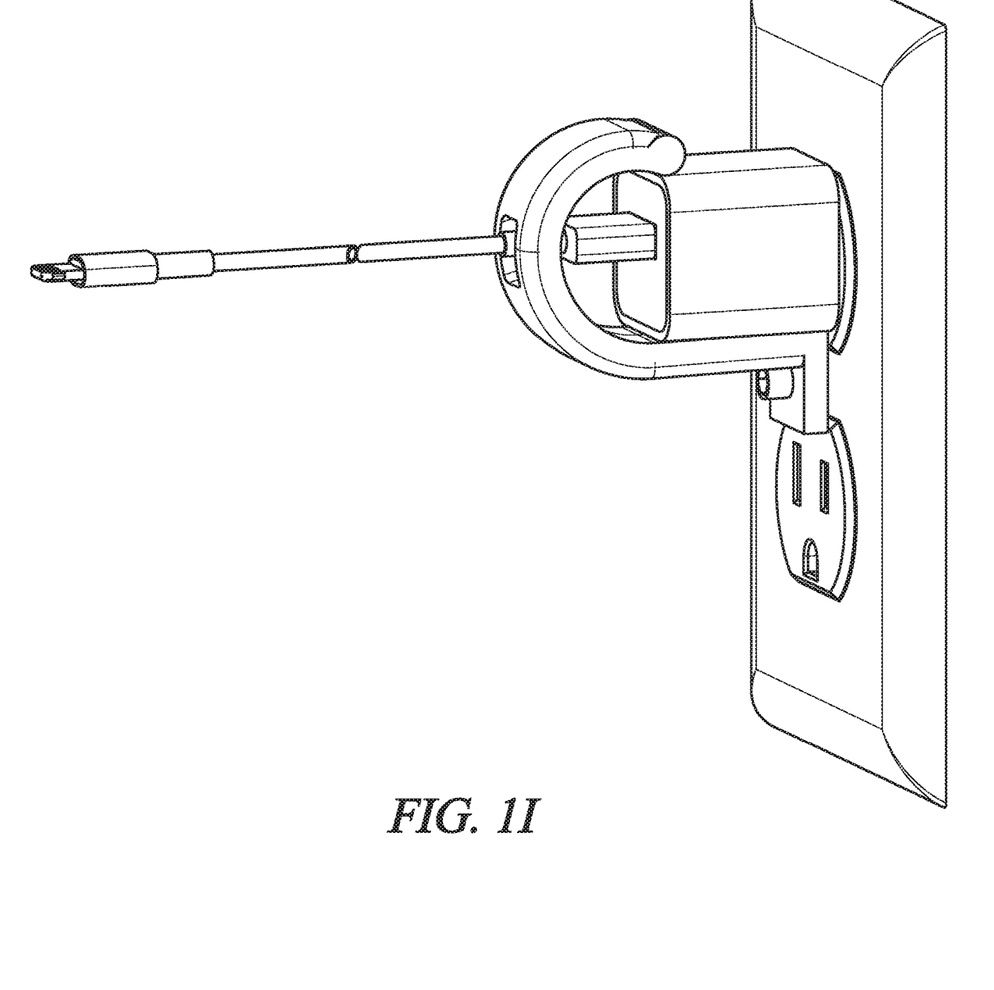
FIG. 1I is a perspective view of the apparatus coupled to a charging cord and charging adapter and secured to a wall outlet with the threaded fastener.
Figure 1J:
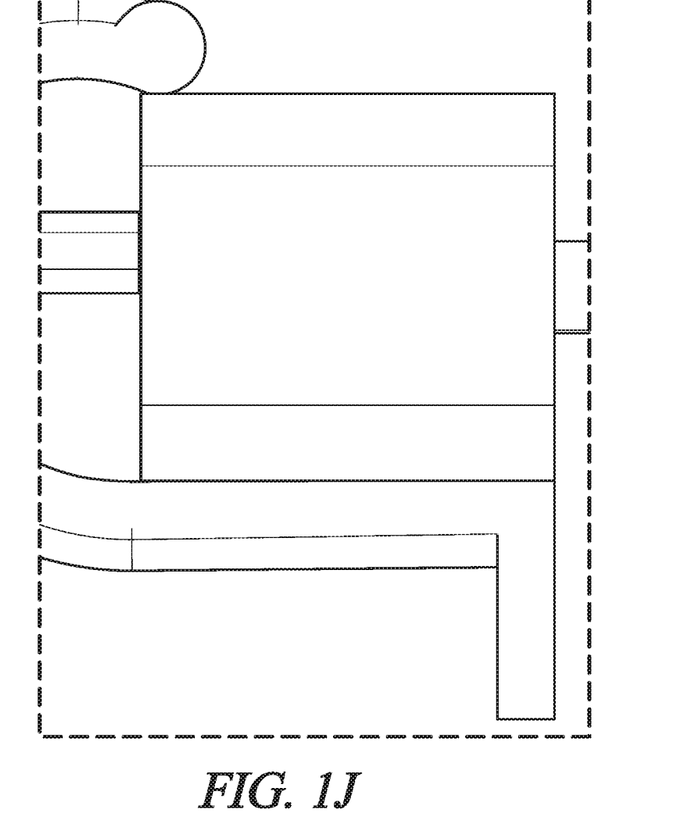
FIG. 1J is a zoomed in view showing contacting surfaces of apparatus coupling to a charger block.

As an example of securing a charging cord and/or charger block or plug with apparatus 100:

Step 1: insert the smaller end of the charger cord into the orifice 118 of the apparatus 100 (FIG. 1G);

Step 2: plug charger block into an electrical outlet (FIG. 1H); and

Step 3: use the existing screw in the outlet or use a keyed accessory (e.g. allen screw) and thread or push the screw or accessory through the hole 116 and screw/fasten to the outlet threads/mating fastener to secure or lock the block charger and/or cord (FIGS. 1H, 1I) to the wall outlet. The order of steps 1) and 2) can be reversed. It is also possible to engage the charger block with the apparatus 100 before plugging in the combined structure into the electrical outlet and securing with the fastener. Apparatus 100 and/or charger block and/or cord can be removed by removing the fastener from the outlet.

As the charger block is inserted into apparatus 100, surface 105 engages a lower surface of the charger block and surface 103 engages a top surface or portion of the charger block. The attached cord that has been threaded through orifice 118 provides additional support means that assists in preventing the removal of apparatus 100 and charger block when fastened to the electrical outlet. For example, for an IPHONE charger cord, orifice 118 is about 8.6 mm×5.3 mm and 10.8 mm×4.8 mm for an IPAD PRO charger cord. For the IPHONE charge cord, the distance (measured perpendicularly) from the inner surface of portion 110 to center of orifice 118 is about 18 mm and about 15 mm for the IPAD PRO charger cord.

Figure 2:
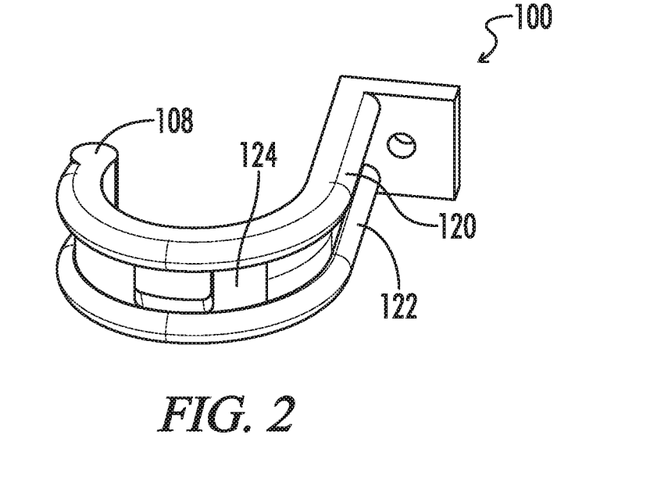
FIG. 2 is a perspective view of the apparatus having longitudinal ribs according to an aspect.
Figure 3A:
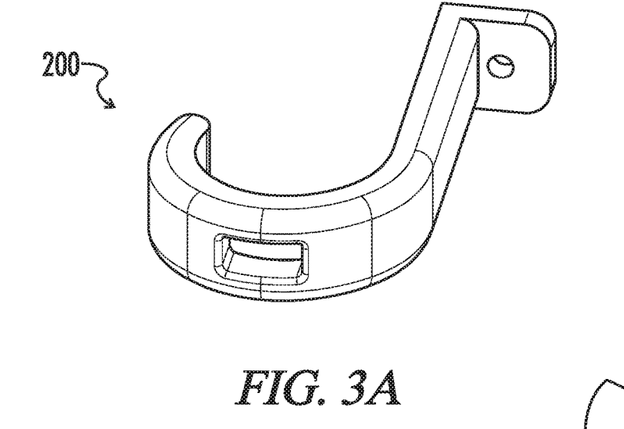
FIG. 3A is a perspective view of the apparatus according to another embodiment.
Figure 3B:
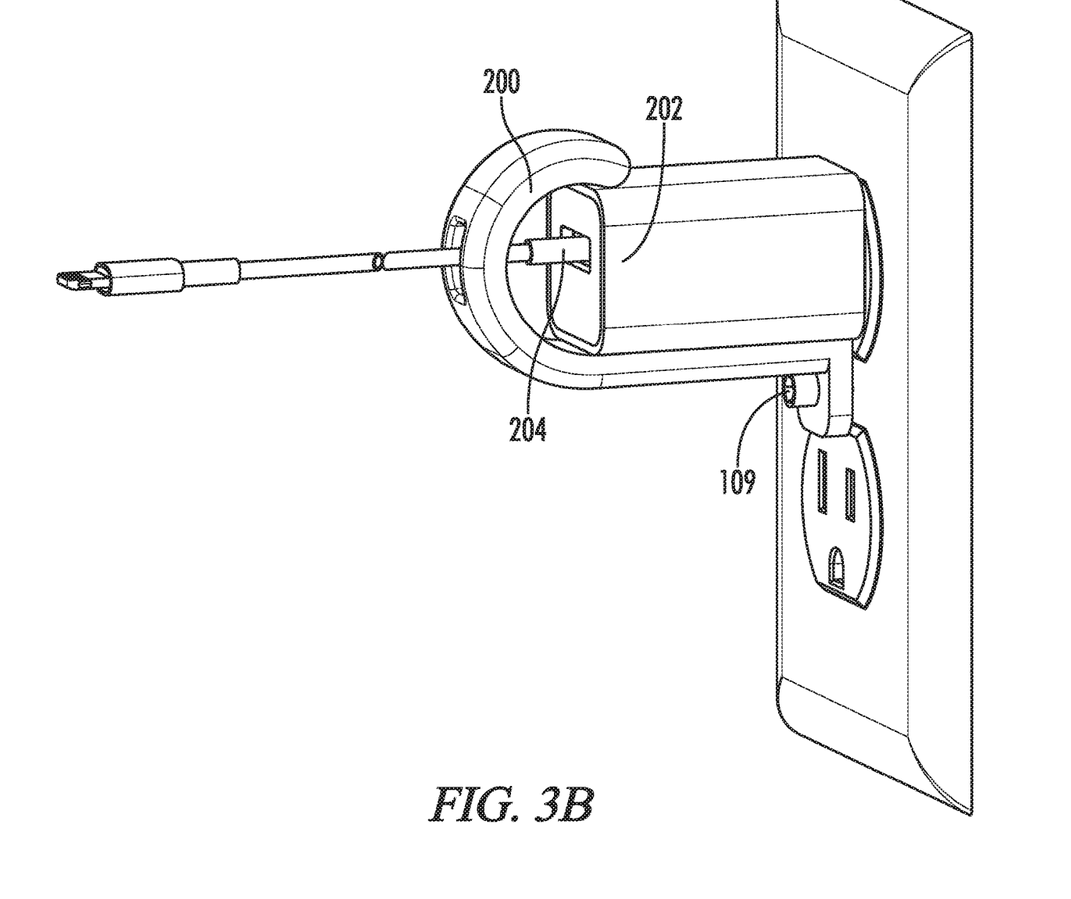
FIG. 3B is a side view of the apparatus coupled to a charging cord and charging adapter.
Figure 3C:
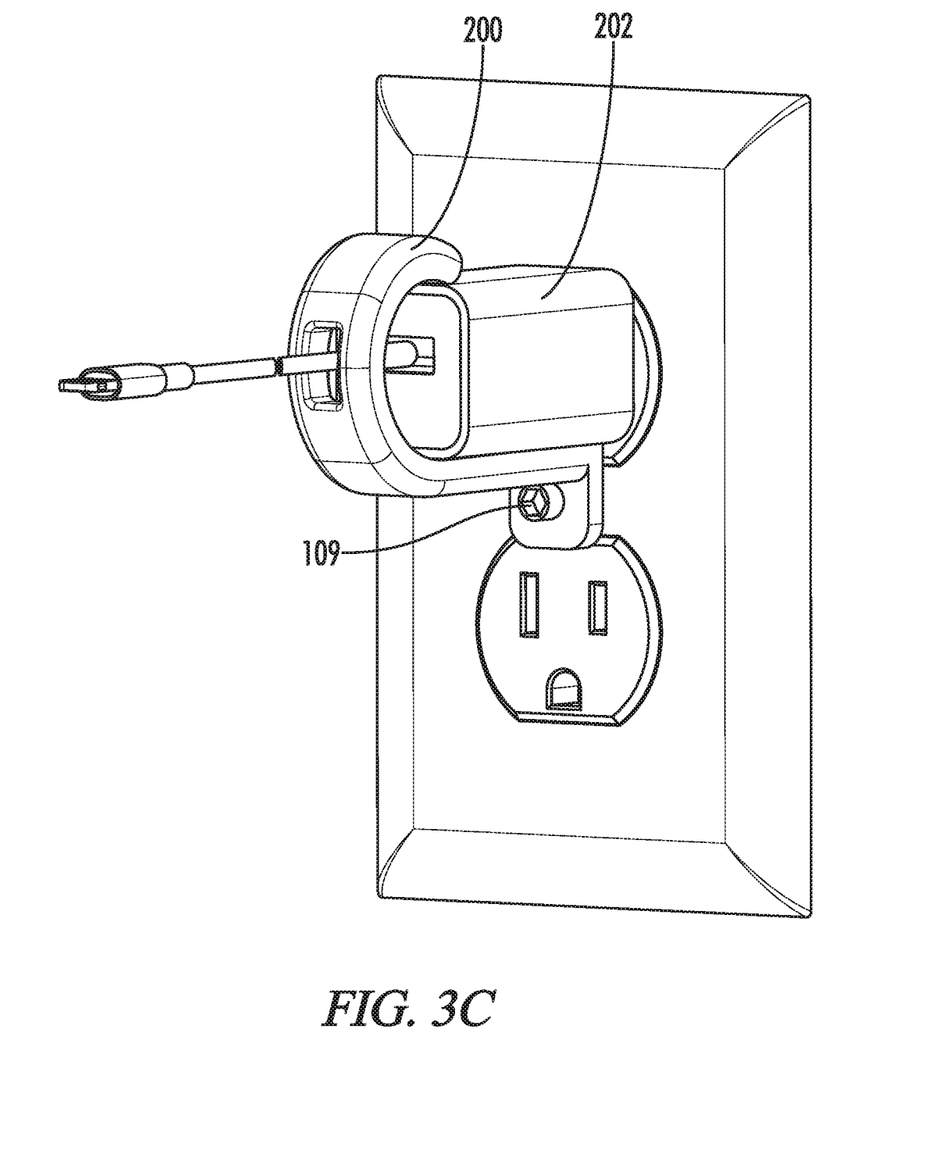
FIG. 3C is a perspective view of the apparatus coupled to a charging cord and charging adapter and secured to a wall outlet using a threaded fastener.
Figure 3D:
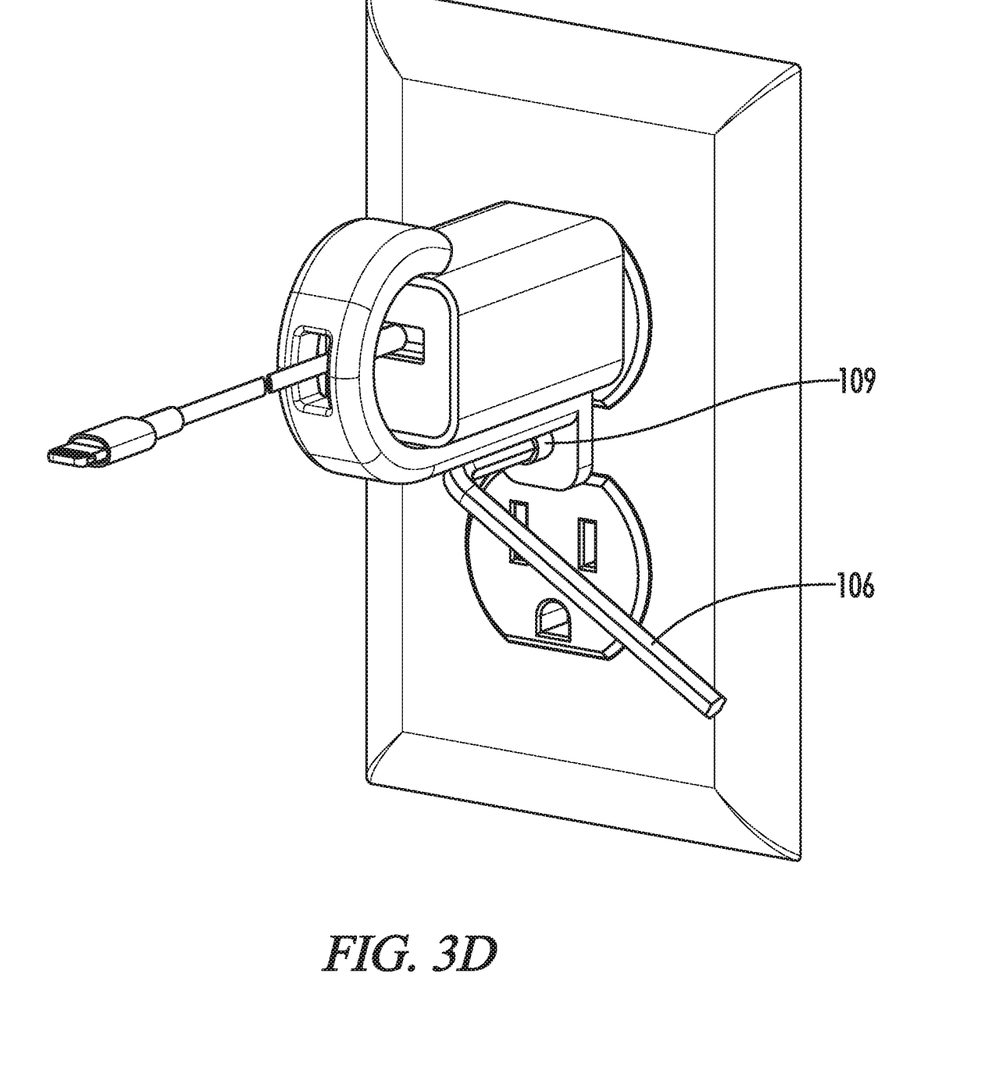
FIG. 3D is a perspective view of the apparatus coupled to a charging cord and charging adapter and secured to a wall outlet with the threaded fastener and complimentary tool.
Figure 3E:
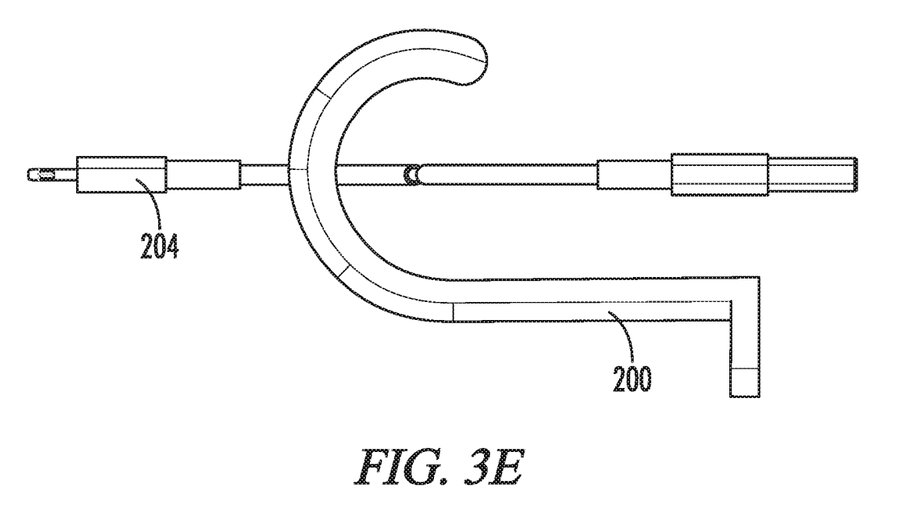
FIG. 3E is a side view of the apparatus with a smaller portion of the charging cord threaded through an orifice or through port of apparatus.

FIG. 2 is a perspective view of apparatus 100 configured with additional structural features. According to an embodiment, the outer surface of first portion 110 includes first and second longitudinal ribs 120 and 122. In other aspects, apparatus 100 can be configured with a single rib, a plurality of ribs (e.g., more than 2), and/or partial longitudinal ribs that traverse defined portions of the outer surface, according to a desired implementation. Apparatus 100 of other aspects can include one or more lateral ribs positioned along the outer surface or other portion of apparatus 100 to add additional rigidity. As shown in FIG. 2, first and second ribs 120 and 122 traverse outer surface of portion 110 from second portion 112 to rib 108 and include a height of about 3 mm as measured from the top of the channel 124. The ribs provide additional support in part to prevent cracking or undue bending of the apparatus 100 if a user attempts to remove apparatus 100 without removing the fastener. Channel 124 is formed between ribs 120 and 122 and is about 5.5 mm wide having a thickness of about 3.4 mm. An additional rib, material, or structure can be provided at the junction of the first and second portions 110, 112 to prevent cracking or breaking at the angle formed therebetween. As will be appreciated first and second portions 110, 112 can be made thicker or thinner according to preference and application. The ribs 120, 122, and front rib 108 can be manufactured in different shapes and/or sizes that include rounded or sharp edges or a combination thereof. For example, each longitudinal rib can be rounded, pointed, or sloped, or some combination thereof.

FIGS. 3A-3E depict apparatus 200 where orifice 118 is sized and dimensioned to accommodate different sized charger cord 204 ends and further depicting fastener 109 and removal tool 106. Additionally, the distance from the top of the curved portion to the wall coupling portion of apparatus 100 is longer to accommodate different sized charger blocks 202. Likewise, the radius or dimensions of the curved portion can be sized to accommodate smaller or larger blocks.

In a commercial embodiment, FIGS. 1A-1J and 2 are configured for IPHONE charger components and FIGS. 3A-3E are configured for iPad Pro USB-C charger components. Apparatus 200 of FIGS. 3A-3E may also be modified to include at least one longitudinal rib and/or one or more lateral ribs. Apparatus 100, 200 can be packed and sold with complimentary charger block and cords.

Figure 4:
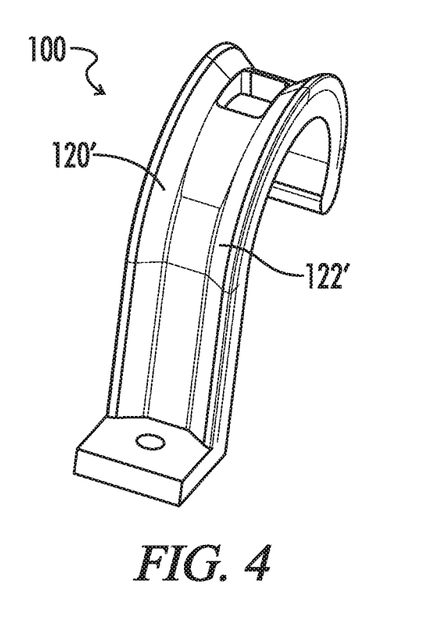
FIG. 4 depicts the apparatus according to an aspect.

FIG. 4 is a view of apparatus 100 (also applies to apparatus 200) having longitudinal ribs 120' and 122' that have a gradual slope or angle from the outside portion of the rib down towards the channel therebetween, providing a strong and resilient force against removal or breakage while also applying additional clamping force to an attached block or adapter. In one embodiment, the angle from the top of the rib to the channel is about 25-50 degrees (measured from about the top of rib to about the channel).

Figure 5A:
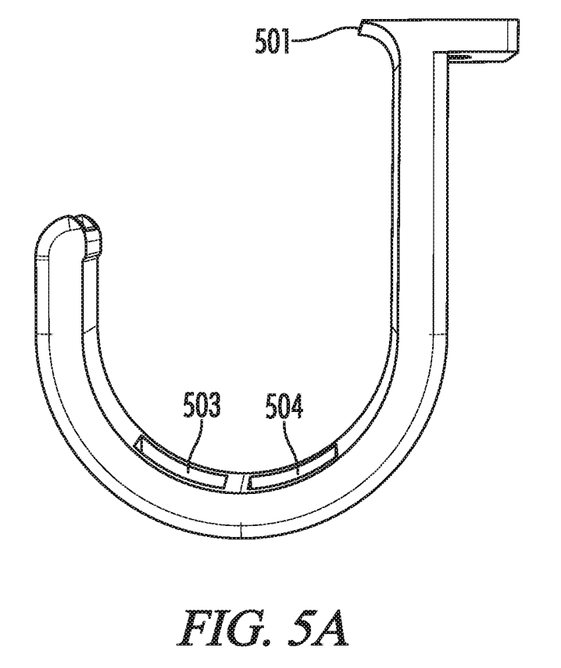
FIGS. 5A-5B are views of an apparatus according to another embodiment.
Figure 5B:
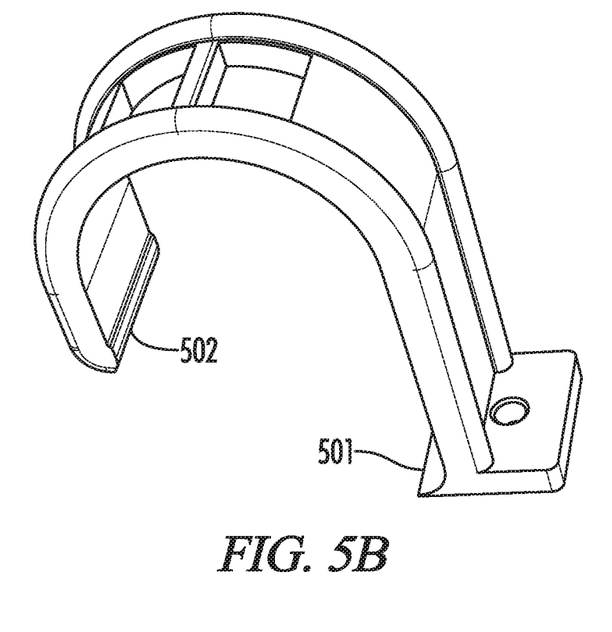

FIGS. 5A-5B are views of apparatus 500 according to an embodiment. For example, the apparatus 500 can be used to secure an IPAD charger or power adapter to a faceplate of an AC outlet using a threaded or other fastener. Apparatus 500 has a substantially hook or J-shape. Apparatus 500 is configured to prevent or make difficult, removal of a charger block and/or cord once secured to a wall outlet.

The hook or J-shape of the apparatus 500 can be configured to apply a clamping or inwardly directed force to one or more surfaces of a charging adapter or block which holds the charger block firmly in place. The hook or J-shape of the apparatus 500 includes coupling surfaces that couple to a portion of an upper surface of a charging block, to all or a portion of a lower surface of the charging block, and to an electrical outlet (e.g., wall plate and/or wall outlet). The coupling surface that couples to a wall plate and/or wall outlet includes a flange or extending internal portion 501 that adds additional rigidity and surface area that provides additional coupling surface when the apparatus is engaged to a wall outlet.

In one embodiment, the distal coupling surface 502 at the end of the curved or portion is configured as a slightly protruding rib or angled portion that angles back towards channel. The coupling surface 502 assists when engaging and disengaging a charger block from the apparatus. The coupling surface 502 applies a downward force that secures the charger block when engaged. Coupling surface 502 can be configured with different dimensions in order to produce larger or smaller amounts of holding force. Instead of a smooth inner surface, apparatus can be knurled or otherwise roughened to apply additional holding force. The various coupling surfaces and overall hook-shape of the apparatus operate to apply a holding force to a charger block when engaged. Apparatus 500 can be sized and configured to secure a variety of sized and dimensioned charger cords and/or adapters and/or wall plugs. The apparatus, when coupled to a charging adapter or wall plug, applies a contact force or inward force that secures the charging adapter by surface contact and associated distributed force.

As shown, apparatus 500 includes two orifices 503 and 504 that may be used to thread and secure a charging cord. In one aspect, one or both of the orifices can include a removable portion or portions (e.g. tab(s)) for enlarging the orifice. Removable tabs may be used in other embodiments as well. Depending on the configuration of the charging block cord inputs, either orifice may be used according to the corresponding block charger cord input and location. Additional or fewer cord orifices may be included in other embodiments. Either or both orifices may be chamfered or angled inwardly (from the inner surface to the outer surface) and configured to allow a smaller end (typically the phone-side coupling) of the charger cord to be threaded therethrough when mounting to a wall outlet. The larger end of the charger cord (typically a USB coupling) is unable to pull through the orifice due to the smaller size of the orifice.

Apparatus 500 includes first and second longitudinal ribs extending over the outer surface. Ribs can have a height of about 2-5 mm as measured from the top of the channel which provide additional support in part to prevent cracking if a user attempts to remove the apparatus without removing the fastener. A channel is formed between ribs and is about 10-12 mm wide having a thickness of about 3-6 mm. Portions of the apparatus can be made thicker or thinner according to preference and application. The ribs and other portions can be manufactured in different shapes and/or sizes that include rounded, angled, sharp, pointed, flat, or other configurations or some combination thereof.

Apparatus 500 includes a through hole or orifice that is sized and dimensioned to accommodate a threaded screw or other fastener that mates to the wall plate and/or wall outlet. The coupling surface that abuts against a wall plate and/or wall outlet is substantially flat and the surface area is configured to mate to the wall plate and/or wall outlet. This coupling surface includes flange or extending internal portion 501. When plugged in, the mating or mounting surface of the charging adapter or block provides additional surface area that enables a secure immovable coupling when fastened with a threaded or other fastener. According to an embodiment, when coupled together, the mating or mounting surface of the charging adapter and the coupling surface of the apparatus results in a larger substantially contiguous surface area for mounting and/or engaging a wall outlet or plate.

In various aspects, apparatus 500 can be configured to include lengths of about 1.5 in. to about 5 in. and widths (measured from the side (J)) of about 1.25 in. to about 2.75 in. but it will be appreciated that fabrication can be used for different sizes, configurations, and/or shapes to accommodate and secure various sized and dimensioned chargers and/or cords. The apparatus 500 can be formed and fabricated in a variety of ways using various means and materials, such as 3-D printing, injection molding, or other techniques and methods. Plastics, metals, and/or other materials can be used to manufacture apparatus.

The foregoing description has been presented for the purposes of illustration and description. It is not intended to be exhaustive or to limit the embodiments to the precise forms disclosed. Many modifications and variations are possible in light of the disclosure. It is intended that the scope of the invention be limited not with this detailed description, but rather by the claims appended hereto.

What is claimed is:

1. A J-shaped apparatus comprising:
    a curved portion that includes at least one coupling surface for coupling to an upper surface of a charger block;
    an outlet mounting portion that includes a coupling surface for coupling to an electrical outlet; and
    a linear portion between the curved portion and the outlet mounting portion that includes at least one coupling surface for coupling to a lower surface of the charger block, wherein the curved portion includes an orifice for threading a charging cord and the outlet mounting portion includes an orifice for securing a fastener to the electrical outlet.

2. The J-shaped apparatus of claim 1, wherein the curved portion includes a substantially flat outer surface.

3. The J-shaped apparatus of claim 1, further comprising at least one longitudinal rib extending along an outer surface of the curved portion and along an outer surface of the linear portion.

4. The J-shaped apparatus of claim 3, wherein the at least one longitudinal rib includes one or more of a sloped surface, a pointed surface, or a curved surface.

5. The J-shaped apparatus of claim 1, wherein an outer surface of the curved portion includes rounded edges.

6. The J-shaped apparatus of claim 1, further comprising a first coupling surface on an interior distal portion of the curved portion.

7. The J-shaped apparatus of claim 6, wherein the first coupling surface of the curved portion is a lateral rib, wherein lateral rib contacts the upper surface of the charger block.

8. The J-shaped apparatus of claim 6, wherein the first coupling surface of the curved portion is substantially flat.

9. The J-shaped apparatus of claim 6, wherein the first coupling surface of the curved portion includes a sloped or pointed surface.

10. The J-shaped apparatus of claim 6, further comprising a second coupling surface extending along an upper surface of the linear portion to couple to the lower surface of the charger block.

11. The J-shaped apparatus of claim 1, a width of the curved portion and a width of the linear portion is less that a width of the charger block.

12. The J-shaped apparatus of claim 1, wherein the orifice of the curved portion is positioned between a first end of the curved portion and the linear portion.

13. The J-shaped apparatus of claim 1 sized and dimensioned to secure a charger block or adapter to the electrical outlet.

14. The J-shaped apparatus of claim 1 sized and dimensioned to secure a portion of an electrical cord from being removed from the charger block.

15. A charger lock kit comprising:
    a J-shaped charger lock that includes:
        an outlet mount;
        a substantially linear portion; and
        a substantially curved portion, wherein the substantially linear portion is positioned between the outlet mount and the substantially curved portion;
    a threaded fastener and/or tool;
    a charger block; and
    a charger cord, wherein the substantially linear portion of the charger lock provides a first coupling surface to couple to a lower surface of the charger block and the substantially curved portion provides a second coupling surface to couple to an upper surface of the charger block.

16. The charger kit of claim 15, wherein the substantially linear portion and the substantially curved portion of the J-shaped charger lock each include a substantially flat outer surface.

17. The charger kit of claim 15, further comprising at least one longitudinal rib that extends along an outer surface of the substantially linear portion and an outer surface of the substantially curved portion, wherein the substantially curved portion terminates at a distal end to provide the second coupling surface to couple to the upper surface of the charger block.

18. A J-shaped apparatus configured to secure a device charger comprising:
    a unitary body that includes a curved portion and a linear portion;
    a first coupling surface included as part of the curved portion to couple to an upper surface of the charger;
    an orifice included as part of the curved portion for securing a charger cord;
    a second coupling surface included as part of the linear portion to couple to a lower surface of the charger; and a mounting surface that includes an orifice configured to receive a fastener for fastening the J-shaped apparatus to an electrical outlet.

19. The J-shaped apparatus of claim 18, wherein at least one of the curved portion and the linear portion include a substantially flat outer surface.

20. The apparatus of claim 18, further comprising at least one longitudinal rib that extends along an outer surface of the curved portion and along an outer surface of the linear portion, and the first coupling surface is part of an end portion of the curved potion and is rounded, sloped, or flat.

* * * * *